Figure 1:
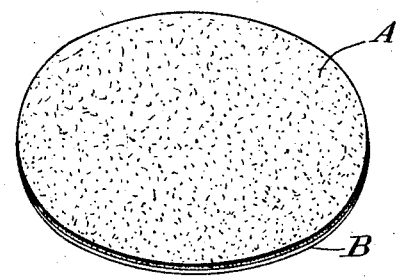

Mar. 3. 1925.

J. P. CONSTABLE

SEAL

Filed July 22, 1921

1,528,403

INVENTOR
John P. Constable
BY
ATTORNEYS

Patented Mar. 3, 1925.

1,528,403

UNITED STATES PATENT OFFICE.

JOHN PIERREPONT CONSTABLE, OF ORANGE, NEW JERSEY.

SEAL.

Application filed July 22, 1921. Serial No. 486,694.

*To all whom it may concern:*

Be it known that I, JOHN P. CONSTABLE, a citizen of the United States, residing at Orange, in the county of Essex, State of New Jersey, have invented certain new and useful Improvements in Seals; and I do hereby declare the following to be a full, clear, and exact description of the invention, such as will enable others skilled in the art to which it appertains to make and use the same.

This invention relates to seals, and particularly to seals of fusible material, such as sealing wax, for use in sealing letters, parcels, and the like. The invention has for its object the provision of an improved sealing device, as a new article of manufacture, whereby seals of fusible material may be more conveniently and more securely applied to letters, parcels, and the like, than has heretofore been possible by the customary methods of sealing such articles.

The heretofore customary method of sealing letters, parcels, and the like, with fusible agents, has involved heating a bar of sealing wax, or similar fusible material, and applying to the thus melted or softened wax to the article to be sealed, and subsequently impressing a monogram or the like upon the softened wax by means of a die or stamp. This method of sealing requires practice and skill for the production of even passable effects, and at its best is an inconvenient and altogether unsatisfactory procedure.

The present invention contemplates an improved method of sealing requiring less skill and adapted to be more readily and more artistically applied to the article to be sealed than any method of sealing heretofore employed. Thus, the method of the invention involves softening by heat a fusible adhesive substance which is maintained in direct contact with the article to be sealed and which is separated from the source of heat by a non-fusible coating firmly united with the fusible substance. When the fusible adhesive substance has been appropriately softened, it is pressed into intimate contact with the material to be sealed by pressure so applied that the fusible substance and the instrument for applying heat and pressure thereto are separated by the aforesaid non-fusible coating. The invention also contemplates the production, as a new article of manufacture, of an improved sealing device which, in its preferred form, comprises a wafer of sealing wax of any appropriate configuration having united therewith and secured to one surface thereof a fabric coating, such as a piece of paper, cloth, or the like.

The novel features which I believe to be patentably characteristic of my invention are definitely indicated in the claims appended hereto.

Figure 2:
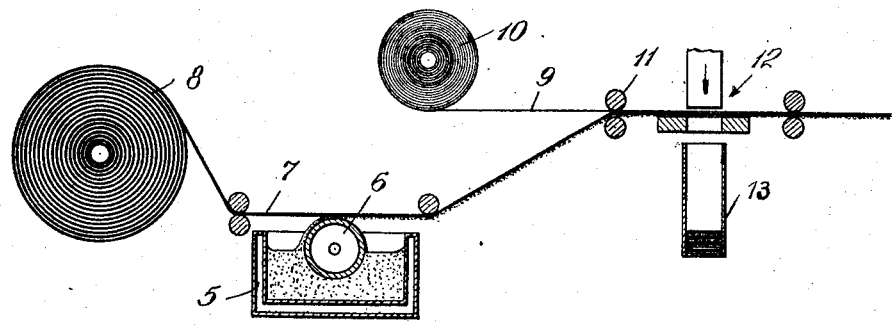

The principle of the invention, its mode of operation and its application will be understood from the following description taken in connection with the accompanying drawing in which;

Fig. 1 is a perspective view of one form of the improved sealing device of the invention, and Fig. 2 diagrammatically indicates one satisfactory arrangement of apparatus for manufacturing sealing devices embodying the principle of the invention.

The sealing device of the invention, as represented in Fig. 1 of the drawing, comprises a wafer of fusible material A, having a non-fusible fabric coating B united with and secured to one surface thereof. The wafer A may consist of any appropriate fusible material, such, for example, as sealing wax, or the like. The non-fusible coating B may conveniently be formed of a thin piece of paper, such, for example, as paraffin paper, or may be formed of cloth or any other appropriate fabric material. The wafers A and B of my improved sealing device are firmly united together, by the adhesion of the fusible material, and form a substantial unitary structure. In another aspect, the improved seal of the invention may be regarded as a fabric of non-fusible material, such as paper, cloth, or the like, coated or covered with a relatively thin layer or film of fusible material, such as sealing wax.

In accordance with my improved method of sealing, the sealing device of the invention is applied to the article to be sealed with the fusible side of the device in direct contact with the article. Heat is applied to the fusible material by an appropriately heated iron, die, stamp, or the like, until the fusible material is sufficiently softened to firmly adhere to the article to be sealed. The softened fusible material is then pressed into intimate contact with the material to be sealed preferably by the instrument employed for heating the fusible material, such instrument being separated from the fusible material by the non-fusible coating of the sealing device. The non-fusible coating prevents the fusible material from sticking to the instrument for applying heat and pressure thereto, and remains firmly attached to the fusible material of the sealing device, thus preventing crumbling of the fusible material. The instrument for applying heat and pressure to the sealing device, such as a die or stamp, may advantageously be electrically heated by the provision within the instrument of an appropriate heating coil or resistance. Since the heated die or stamp comes in contact only with the non-fusible backing of the sealing device, and not with the fusible material itself, as in the heretofore customary methods of sealing, the usual difficulties of the sticking of the fusible material to the die or stamp and the filling up of the engraving in the die or stamp is eliminated.

Fig. 2 of the accompanying drawing diagrammatically represents an arrangement of apparatus which may advantageously be employed in the production of the improved sealing device of the invention. In this apparatus, the fusible material is held in a steam-jacketed receptacle 5 and is maintained in a fluid condition in this receptacle by passing steam of the necessary temperature through the jacket of the receptacle. A hollow steam-heated cylindrical metal roll 6 dips into the fluid fusible material in the receptacle 5, and by its rotation carries into contact with a traveling sheet of paper 7 a sufficient amount of the fusible material to coat the paper to the desired extent for the purposes of the invention. The paper is supplied from a roll 8 and is passed over suitable guide-rolls as will be well understood in the art. By varying the relative speeds of rotation of the paper roll 8 and the wax feeding roll 6, different thicknesses of fusible material may be applied to the paper 7.

In certain instances, as more fully explained hereinafter, it is desirable to apply an additional backing fabric to the sealing device, and the apparatus represented in Fig. 2 of the accompanying drawing is designed to carry out this feature of the invention. Thus the additional backing comprises a sheet of paper, or other suitable fabric, 9 fed from a roll 10 and pressed into contact with the paper 7 by cooperating rolls 11. A punch 12 is provided for cutting out or punching out sealing devices of the desired configuration. Usually these sealing devices will be cut out in the form of circles or disks and may conveniently be received in magazines 13.

The magazines for the finished seals may conveniently be paste-board tubes holding from 100 to 200 seals depending upon their thickness. These tubes constitute a package in which the seals can be placed upon the market and in use constitute a magazine for the machines employed in applying the seals to letters, packages or other articles to be sealed. In case the seals are not to be applied by machine a small stand can be furnished which will hold the tubes and from which the seals can be withdrawn, in a somewhat similar way as coins are withdrawn from coin cases.

The use of steam in heating the revolving roller 6 and for supplying steam to the steam jacket of the receptacle 5 furnishes very satisfactory means for controlling the proper consistency of the fusible material, such, for example, as sealing wax. The distance between the revolving roller 6 and the punching press 12 is just sufficient to allow the sealing wax, or other fusible coating on the paper, to become rubbery. This eliminates the difficulties of the sticking of the sealing wax to the platform or other parts of the punch press and at the same time leaves the wax in such a condition that it can easily be punched into seals without cracking.

The non-fusible material employed in the production of the seals of the invention may be of paper, cloth, or other suitable fabric, and may be of any appropriate thickness or size and may be printed, colored or plain, according to the use to which the seal is to be put. I have found paraffin paper a very satisfactory fabric in the production of the seals of the invention. In some instances, a backing of thin paraffin paper is insufficient and may lead to difficulties particularly in the manufacture and application of seals having a thick coating of wax, since the punching die might break the paraffin paper and cause the wax to stick to the die, or the thin paper might be broken in applying the seal. In such cases, a multiple backing may advantageously be used, such multiple backing consisting of the thin paraffin paper united to the wafer of fusible material and an additional paper backing in contact with the thin paraffin paper and adapted to be easily removed therefrom after the application of the seal. For all ordinary uses, it is satisfactory to provide the seals of the invention with a non-fusible backing of ordinary paper, proper precautions being taken in extremely hot weather to prevent the seals from sticking together.

The seals of the invention may be used in sealing a wide variety of different classes of articles by appropriately adjusting the thickness of the layer of fusible material and by employing in conjunction therewith a coating or backing of appropriate fabric material. The seals may obviously be made of any desired size or shape and may be provided with any appropriate marks of identification or ornamentation.

I claim:

1. As a new article of manufacture, a device for sealing letters, packages, and the like comprising a wafer of sealing wax having a piece of paper united with and secured to one surface thereof.

2. As a new article of manufacture, a device for sealing letters, packages and the like, comprising a wafer of sealing wax having a wafer of non-fusible material firmly and securely united to one surface thereof.

3. As a new article of manufacture, a device comprising a wafer of sealing wax and a wafer of paper firmly and securely united together.

In testimony whereof I affix my signature.

JOHN PIERREPONT CONSTABLE.